United States Patent Office 2,760,986
Patented Aug. 28, 1956

2,760,986

PROCESS FOR PREPARING β-KETOACETALS

George L. Fletcher and James S. Hull, Rochester, N. Y., assignors to Eastman Kodak Company, Rochester, N. Y., a corporation of New Jersey No Drawing. Application May 29, 1953,
Serial No. 358,524

8 Claims. (Cl. 260—594)

This invention relates to an improved process for preparing β-ketoacetals and is particularly concerned with preparing β-ketobutyraldehyde dimethyl acetal in maximum yield.

Acetals of β-ketoaldehydes are useful intermediates in the synthesis of α,β-unsaturated aldehydes, and the β-ketoacetals have found particular use in the synthesis of pharmaceuticals including antibiotics such as sulfamerazine and vitamins such as vitamin A. The β-ketoacetals can be prepared by reacting an alkali metal enolate of a β-ketoaldehyde with an alcohol in the presence of an acidic catalyst, and a process for preparing β-ketoacetals in this manner in good yield while minimizing formation of β-ketovinyl ether and triacetyl benzene is disclosed in the copending application of Burness, Serial No. 357,644 filed May 26, 1953.

As in all syntheses, however, the ultimate goal is to produce β-ketoacetals in quantitative amounts or as nearly quantitative amounts as possible by as simple a method as possible.

It is accordingly an object of this invention to provide an improved process for preparing β-ketoacetals.

It is a further object of the invention to facilitate the commercial production of β-ketoacetals by minimizing the operative steps in the process.

Another object of the invention is to prepare β-ketobutyraldehyde dimethyl acetal in higher yields than were obtainable heretofore.

Other objects will be apparent from the description and claims which follow.

These and other objects are attained in accordance with this invention which comprises effecting the reaction between an alkali metal formyl ketone (also sometimes known as alkali metal hydroxymethylene acetone) and an aliphatic monohydric alcohol containing hydrogen chloride, in methyl formate media. In a preferred embodiment, the alkali metal formyl ketone is prepared by reacting a ketone, methyl formate and an alkali metal or alkali metal alcoholate in excess methyl formate to form a slurry of alkali metal formyl ketone in the methyl formate, and then adding this methyl formate slurry to methyl alcohol and hydrogen chloride whereby the reaction is effected in methyl formate with an increased yield of β-ketoacetal over processes where the methyl alcohol acts both as vehicle and reactant or where some other solvent is used. The reason why the use of methyl formate, in which the alkali metal formyl acetone is insoluble and the β-ketoacetal is soluble, promotes the formation of β-ketoacetal in higher yields than expected is not understood at this time. In preparing β-ketoacetals in accordance with this process and particularly under the controlled pH conditions as described more fully hereinafter with reference to a preferred embodiment, yields of 80% or higher have been obtained.

In the preferred process, an alkali metal formyl ketone is reacted under substantially anhydrous conditions with methyl alcohol in methyl formate and in the presence of sufficient hydrogen chloride to maintain the measured apparent pH of the non-aqueous reaction mixture below about 1 throughout the reacting, which includes the time during which the alkali metal formyl ketone and alcohol are being admixed. Following reaction, the mixture is carefully neutralized to a pH not higher than 7 and desirably from 6 to 7, preferably in non-aqueous media, and the β-ketoacetal is recovered from the neutralized mixture at such pH of 6 to 7. The pH values referred to are the apparent values as measured in the non-aqueous media on a Beckmann pH meter, and the pH values referred to hereinafter are such apparent values giving a reading corresponding to the pH in aqueous media.

Although it is desirable to prepare the alkali metal formyl ketone by reacting a ketone, a formate and an alkali metal or alkali metal alcoholate in methyl formate to form a slurry of the alkali metal formyl ketone in the methyl formate for direct addition in the preferred process, the alkali metal formyl ketone can be prepared in any desired manner and can be then admixed with methyl formate prior to addition to the acetalizing reaction mixture or added separately as desired. It is preferred, however, to prepare the slurry directly by formation of the alkali metal formyl ketone in the methyl formate media since this obviates purifying or recovering the alkali metal formyl ketone from the reaction mixture in which it is formed or dissolving it in another solvent such as methyl alcohol. The ketone employed in preparing the alkali metal formyl ketone, of course, will depend upon the particular β-ketoacetal which is desired, and any of the well-known ketones can be used as typified by such as acetone, methyl ethyl ketone, diethyl ketone, methyl vinyl ketone and the like which are suitably employed. Similarly any of the well-known formate esters can be employed such as ethyl formate or the like; but, since methyl formate is employed as vehicle in the preferred process, the formate is desirably methyl formate in an excess amount whereby it fulfills the dual function of a reactant and vehicle.

The alkali metal formyl ketone can be prepared effectively from either an alkali metal or an alkali metal alcoholate. The particular alkali metal will depend on the product desired although particularly good results are obtained using either sodium metal or a sodium alcoholate. Because of ease of handling, the alkali metal alcoholates and particularly the alkali metal alkoxides are preferred. Typical examples of suitable materials include metallic sodium, metallic potassimu, sodium methoxide, sodium ethoxide, sodium isopropoxide, potassium methoxide, potassium ethoxide, potassium isopropoxide and similar well-known alkali metals and alkali metal alkoxides.

The reaction between the ketone, formate and alkali metal or alkali metal alcoholate proceeds readily; and, due to the heat evolved, the reaction mixture is desirably cooled to 15–25° C. particularly during the early stages. Best results are obtained by first mixing the methyl formate and the alkali metal or alkali metal alcoholate and then adding the ketone to the resulting mixture since the reaction is less violent and more readily controlled than when using a different order of addition. During the latter stages of the reaction, forced reflux can be employed for optimum results. By using theoretical quantities of the reactants, the reaction proceeds almost quantitatively, and a thick slurry of alkali metal formyl ketone in the methyl formate is obtained.

This slurry is then progressively added to a solution of anhydrous hydrogen chloride in anhydrous methyl alcohol. The methanolic hydrogen chloride desirably has a normality of 5 to 6, and the hydrogen chloride is present in a total amount sufficient to maintain the pH of the resulting mixture below about 1 and preferably from 0.0 to 1.0 throughout the addition whereby the alkali metal formyl ketone contacts the methyl alcohol in the acidic medium only at such low pH. In order to avoid localized areas of higher pH, the slurry is added progressively over a period of time which will vary with the quantity to be added and the degree of agitation employed. The mixture is stirred throughout the addition, and the temperature is maintained below 25° C. and preferably at 15–25° C. throughout the reaction period including the admixing. As the reaction proceeds, the β-ketoacetal formed in the reaction mixture goes into solution in the methyl formate and the solid alkali metal formyl ketone is gradually used up. At this pH, little or no triacetyl benzene is formed as a byproduct of the reaction. Following addition of the slurry to the methanolic hydrogen chloride, the reaction mixture is maintained at a pH below 1 and a temperature of 15–25° C. for a time sufficient for the reaction to proceed to completion. The time can be varied, of course, but best results are obtained by allowing the mixture to stand for at least two hours and periods of two to six hours are usually effective for optimum yield.

Upon completion of the reaction step, the resulting mixture is carefully neutralized to a pH not higher than 7 and desirably from 6 to 7 in order that the β-ketoacetal can be separated without formation of undue amounts of β-ketovinyl ether or other undesirable byproducts. This neutralization can be effected in accordance with known practices but best results are obtained by effecting the neutralization in non-aqueous media and preferably by the use of an alkali metal alkoxide, such as sodium methoxide, desirably in solution in a solvent such as methyl alcohol.

The neutralized mixture is then filtered to remove precipitated salts, as, for example, the large quantities of sodium chloride formed in neutralization with a sodium alkoxide. The β-ketoacetal is then recovered from the neutralized mixture at the pH of 6 to 7. This can be effected by any convenient recovery process, but especially good results are obtained by distilling away the unused methyl alcohol and the methyl formate vehicle from the neutralized and filtered mixture, and then vacuum distilling the stripped β-ketoacetal for further purification.

The invention is illustrated by the following example of a preferred embodiment for preparing β-ketobutyraldehyde dimethyl acetal, but it will be understood that the example is not intended to limit the scope of the invention unless otherwise indicated and that other β-ketoacetals can be prepared in similar fashion and as described hereinabove using reactants and conditions within the ranges of equivalents as indicated.

*Example*

A mixture of sodium methoxide and methyl formate was prepared by adding 10.31 kg. of methyl formate to 1 kg. of sodium methoxide in a suitable reactor maintained at a temperature of 10°–15° C. The mixture was agitated and refluxed for 15 minutes following the addition. Acetone in a total quantity of 1.088 kgs. was then slowly added to the mixture, and the resulting mixture was refluxed for two hours. At the end of this time, a thick slurry of sodium formyl acetone in methyl formate had been obtained. A solution of hydrogen chloride in methyl alcohol was prepared in a second reactor by dissolving 0.76 kg. of anhydrous hydrogen chloride in 3.315 kgs. of anhydrous methyl alcohol. With the methanolic hydrogen chloride at a temperature of 15° C., the slurry of sodium formyl acetone in methyl formate was slowly added over a period of about 30 minutes, during which time the mixture was being agitated and maintained at a temperature of 15–25° C. The reaction mixture at the completion of the addition of the slurry had a pH in the range of 0.0 to 1.0. This strongly acid mixture was then agitated at a temperature of 20–25° C. for 4 hours to allow completion of the reaction. At the end of this time, a solution of 0.10 kg. of sodium methoxide in 0.12 gal. of methyl alcohol was slowly added until the pH reached a value of 6 to 7. The precipitated sodium chloride was then filtered out of the neutralized mixture, and the filtrate was fractionally distilled under a partial vacuum to remove the methyl alcohol and methyl formate. The residue of crude β-ketobutyraldehyde dimethyl acetal was again filtered and then fractionally distilled at a temperature of 55°–56° C. and a pressure of 8–10 mm. Hg to give 1.88 kg. of product having $N_D^{20}=1.4130–1.4162$;

$$E_{1\,cm.}^{1\%}(244m\mu)=38–68$$

and containing less than 0.1% of water. This represented a yield of 81% based on the original sodium methoxide.

Similar results are obtained in preparing other β-ketoacetals in methyl formate media, and the invention thus provides a simple and economical method for improving the yield of β-ketoacetals.

Although the invention has been described in considerable detail with particular reference to a preferred embodiment, it will be understood that variations and modifications can be effected within the spirit and scope of the invention as described hereinabove and as defined in the appended claims.

We claim:

1. In the preparation of a β-ketoacetal by reacting an alkali metal formyl ketone with an aliphatic monohydric alcohol in the presence of hydrogen chloride and under substantially anhydrous conditions, the method of increasing the yield of β-ketoacetal which comprises carrying out said reacting in methyl formate.

2. The method which comprises reacting an alkali metal formyl acetone with methyl alcohol in methyl formate and in the presence of sufficient hydrogen chloride to maintain the pH of the reaction mixture below about 1 throughout said reacting, said reaction being effected under substantially anhydrous conditions, thereafter neutralizing the reaction mixture to a pH of 6 to 7, and separating β-ketobutyraldehyde dimethyl acetal from the neutralized mixture.

3. The method which comprises adding a slurry of alkali metal formyl acetone in methyl formate to anhydrous methyl alcohol containing anhydrous hydrogen chloride in a sufficient amount to maintain the pH of the resulting mixture below about 1 throughout said adding, maintaining said resulting mixture at said pH while continuing the reacting between said alkali metal formyl acetone and said methyl alcohol, thereafter neutralizing the reaction mixture to a pH of 6 to 7, and recovering β-ketobutyraldehyde dimethyl acetal from the resulting neutralized mixture.

4. The method which comprises progressively adding a slurry of sodium formyl acetone in methyl formate to a solution of anhydrous hydrogen chloride in methyl alcohol, said hydrogen chloride being present in an amount effective to maintain the pH of the resulting mixture below about 1 throughout said adding, maintaining said mixture at said pH for a time sufficient for reaction between said sodium formyl acetone and said methyl alcohol, thereafter neutralizing said mixture with a basic material in a non-aqueous solvent to a pH of 6 to 7, and separating β-ketobutyraldehyde dimethyl acetal from the neutralized mixture.

5. The method which comprises progressively adding a slurry of sodium formyl acetone in methyl formate to a solution of anhydrous hydrogen chloride in anhydrous methyl alcohol, said hydrogen chloride being present in an amount effective to maintain the pH of the resulting mixture below about 1 throughout said adding, maintaining said mixture at said pH for a time sufficient for reaction, and maintaining said mixture at a temperature not higher than 25° C. during said adding and said reaction time, thereafter neutralizing said mixture to a pH of 6 to 7 by adding thereto a solution of an alkali metal alcoholate in an organic solvent, and recovering β-ketobutyraldehyde dimethyl acetal from the neutralized mixture by vacuum distilling said neutralized mixture.

6. The method which comprises reacting a ketone, methyl formate and a member selected from the group consisting of alkali metals and alkali metal alcoholates in excess methyl formate and thereby forming a slurry of alkali metal formyl ketone in methyl formate, adding said slurry of alkali metal formyl ketone in methyl formate to a solution of hydrogen chloride in methyl alcohol, said hydrogen chloride being present in an amount sufficient to maintain the pH of the resulting mixture below about 1 throughout said adding, maintaining said mixture at said pH for a time sufficient to effect reaction between said alkali metal formyl ketone and said methyl alcohol, neutralizing said mixture to a pH of 6 to 7, and recovering β-ketoacetal from the neutralized mixture.

7. The method which comprises reacting acetone, methyl formate and a member of the group consisting of alkali metals and alkali metal alcoholates in excess methyl formate and thereby forming a slurry of alkali metal formyl acetone in methyl formate, progressively adding said slurry of alkali metal formyl acetone in methyl formate to a solution of anhydrous hydrogen chloride in anhydrous methyl alcohol, maintaining the resulting mixture at a temperature below 25° C. and a pH below 1 throughout said adding and for an additional time sufficient for reacting said alkali metal formyl acetone with said methyl alcohol to form β-ketobutyraldehyde dimethyl acetal, thereafter neutralizing said mixture to a pH of 6 to 7 by adding thereto a basic material in an organic solvent, and recovering said β-ketobutyraldehyde dimethyl acetal from said neutralized mixture.

8. The method which comprises reacting acetone, methyl formate and sodium alkoxide in excess methyl formate and thereby forming a slurry of sodium formyl acetone in methyl formate, progressively adding said slurry of sodium formyl acetone in methyl formate to a solution of anhydrous hydrogen chloride in anhydrous methyl alcohol, said hydrogen chloride being present in an amount sufficient to maintain the resulting mixture at a pH below 1 throughout said adding, maintaining said resulting mixture at a temperature of 15-25° C. throughout said adding and for an additional time sufficient for optimum formation of β-ketobutyraldehyde dimethyl acetal, thereafter neutralizing said mixture to a pH of 6 to 7 by progressively adding thereto an alkali metal alkoxide in the absence of substantial amounts of water, and distilling the neutralized mixture to recover β-ketobutyraldehyde dimethyl acetal.

References Cited in the file of this patent
UNITED STATES PATENTS

| | | |
|---|---|---|
| 2,378,573 | Natta | June 19, 1945 |
| 2,570,713 | Richmond | Oct. 9, 1951 |